Patented Sept. 4, 1951

2,566,925

UNITED STATES PATENT OFFICE 2,566,925

ONE-PHASE ANTIRUST LIQUID CONTAINING TRIETHANOLAMINE METABORATE, TRIETHANOLAMINE, AND MIXED MONORICINOLEATE ESTERS

Lloyd M. Burghart, Darien, Conn., assignor, by mesne assignments, to National Distillers Products Corporation, New York, N. Y., a corporation of Virginia No Drawing. Application November 13, 1947, Serial No. 785,828

8 Claims. (Cl. 252—75)

This invention relates to one-phase, liquid antirust concentrates, and more particularly to such concentrates which are suitable for packaging in small units sized for convenient treatment of individual pieces of equipment, such as automobile radiators, etc.

It has become quite generally recognized that protection of an automobile radiator against corrosion during summer driving is just as important as the use of a properly inhibited antifreeze solution (e. g., ethylene glycol) in winter driving. Generally speaking, any inhibitor or combination of inhibitors contained in an antifreeze may be expected to yield as good corrosion protection if supplied to the water used in a radiator during the summer season. That this is true may be inferred from the fact that most antifreeze producers have at one time or another attempted to market some form of concentrate of the antirust ingredient or ingredients which they add to their antifreeze solutions.

If the corrosion inhibitor is a single chemical compound, whether liquid or solid, the preparation of suitable unit packages is a simple and obvious matter. If the inhibitor consists of more than one chemical compound and the individual components are solid, the preparation of a unit package is practically as easy as for the preceding. If a liquid antirust composed of mixed inhibitors is to be prepared and the individual components are known to be soluble in a specified common solvent, there is still little difficulty in marketing the antirust as a one-phase product. If, however, the inhibitor components are unlike in type (for instance, some of them being organic and oily in type and others inorganic and of a water-soluble type) and are not known to be soluble in any common solvent, a field for extensive experiment opens up when one attempts to prepare a highly concentrated one-phase liquid product containing such components.

It is therefore an object of this invention to prepare a one-phase, liquid antirust concentrate containing unlike types of corrosion inhibitors.

It is also an object of this invention to prepare a one-phase, liquid antirust concentrate containing as corrosion inhibitors an alkanolamine metaborate or diacetonealkamine metaborate, an alkali metal nitrite and a mixture of monoricinoleates of ethylene glycol and glycerol.

The aforementioned and other objects are accomplished in accordance with this invention by mixing the alkanolamine metaborate or diacetonealkamine metaborate, alkali metal nitrite and mixture of monoricinoleates of ethylene glycol and glycerol in a solvent which consists of a mixture of ethylene glycol or propylene glycol and isopropanol, n-butanol or tert.-butanol.

For example, a specific composition falling within the scope of the present invention may be prepared by adding 3.33 gms. of sodium nitrite (added as a 40% aqueous solution), 66.1 gms. of triethanolamine, 22.2 gms. of orthoboric acid and 51.51 gms. of a mixture of monoricinoleates of glycerol and ethylene glycol to a solvent consisting of 82.76 ml. of propylene glycol and 17.24 ml. of n-butanol at room temperature, and thereafter stirring the mixture until it is homogeneous. The triethanolamine and orthoboric acid react in situ in the composition to form 68.8 gms. of triethanolamine metaborate and 6.4 gms. of water, leaving in excess 13.1 gms. of triethanolamine.

Various modifications may be made in the aforementioned specific composition to provide additional one-phase, liquid antirust concentrates which fall within the scope of the present invention. Thus, the relative proportions of the glycol and the alcohol may be varied so that the organic solvent portion of the concentrate contains from about 65 to about 95% by volume of ethylene glycol or propylene glycol (or mixtures thereof) and from about 5 to about 35% by volume of i-propanol, n-butanol or tert.-butanol (or mixtures thereof). In addition, the aqueous sodium nitrite employed in the preparation of the specific composition may be replaced by anhydrous sodium nitrite; and sodium nitrite may be replaced by an equal weight of other alkali metal nitrites, such as lithium nitrite or potassium nitrite. In general, the composition should contain from about 0.005 to about 0.05 gm. of alkali metal nitrite per ml. of glycolalcohol solvent.

In the specific example, the triethanolamine metaborate was formed in situ in the composition, since that is the most convenient method of incorporating that compound into the fluid antirust concentrate. Alternatively, however, the triethanolamine metaborate may be produced externally of the composition, and thereafter added as such thereto. Furthermore, in place of the metaborate of triethanolamine there may be substituted the metaborates of the other ethanolamines (viz., monoethanolamine and diethanolamine) and of the propanolamines (e. g., monoisopropanolamine, dipropanolamine and triisopropanolamine) or diacetonealkamine $$(CH_3-CH(OH)-CH(NH_2)-CO-CH_3)$$

In general, the composition of the present invention should be as highly concentrated as possible from the standpoint of the metaborate contained therein, and hence it should contain at least about 0.10, and preferably at least about 0.50, gm. of metaborate per ml. of glycol-alcohol solvent. The upper limit of concentration of the metaborate will generally be about 1.00 gm. thereof per ml. of glycolalcohol solvent. In addition, as the specific examples illustrate, the composition should contain free amounts of the ethanolamines, propanolamines or diacetonealkamine to assist in the solution of the metaborate. For such purpose, from about 0.10 to about 0.30 gm. of the ethanolamines, propanolamines or diacetonealkamine per gm. of metaborate should preferably be employed.

The preparation of the mixture of monoricinoleates of glycerol and ethylene glycol may be accomplished by heating in contact with sodium hydroxide a mixture of ethylene glycol and castor oil until a one-phase mixture is obtained, in accordance with procedures which are well taught in the art, for example, in U. S. Patent No. 2,386,182. Here again, the concentration of the monoricinoleate mixture in the composition may be varied. In general, however, the composition should contain at least 0.15 gm. of the monoricinoleate mixture per ml. of glycol-alcohol solvent, and the upper limit of concentration of the monoricinoleate mixture will generally be about 0.60 gm. thereof per ml. of glycol-alcohol solvent.

The composition of the present invention is essentially a solution of three corrosion inhibitors (alkali metal nitrite, metaborate, and mixture of monoricinoleates of glycerol and ethylene glycol) dissolved in a mixture of solvents (ethylene glycol or propylene glycol and i-propanol, n-butanol, or tert.-butanol). The composition may, however, contain certain amounts of other ingredients which do not detract from its utility or advantageous properties, such as dyes or water, the latter of which, if present at all, may be present in an amount up to about 0.50 gm. per ml. of glycol-alcohol solvent.

The composition described herein is a valuable composition of matter in that it is one-phase and hence can be easily dispensed, and also in that about one-half pint thereof will satisfactorily inhibit the corrosion in the average automobile radiator (4 gal. capacity). Furthermore, as will be apparent to those skilled in the art, the composition may be added to heat transfer fluids (e. g., water, monohydric aliphatic alcohols or polyhydric aliphatic alcohols, or mixtures of such alcohols with water) used in a wide variety of other heat transfer apparatus.

I claim:

1. A concentrated one-phase anti-corrosive liquid solution suitable for addition to water contained in the cooling system of an internal combustion engine to inhibit the corrosion therein, the said solution consisting essentially of an organic solvent which consists essentially of from about 65 to about 95% by volume of at least one glycol selected from the group consisting of ethylene glycol and propylene glycol and from about 5 to about 35% by volume of at least one monohydric alcohol selected from the group consisting of i-propanol, n-butanol and tert.-butanol, up to about 0.50 gm. of water per ml. of glycol-monohydric alcohol solvent, and dissolved therein, from about 0.005 to about 0.05 gm. of an alkali metal nitrite per ml. of glycol-monohydric alcohol solvent, from about 0.10 gm. to about 1.00 gm. per ml. of glycol-monohydric alcohol solvent of a metaborate of at least one amine selected from the group consisting of the ethanolamines, the propanolamines and diacetonealkamine, from about 0.10 to about 0.30 gm. per gm. of said metaborate of at least one amine selected from the group consisting of the ethanolamines, the propanolamines and diacetonealkamines, and from about 0.15 gm. to about 0.60 gm. of mixed ethylene glycol-glycerol monoricinoleates per ml. of glycol-monohydric alcohol solvent.

2. Composition as in claim 1 in which the alkali metal nitrite is sodium nitrite.

3. Composition as in claim 2 in which the glycol is ethylene glycol.

4. Composition as in claim 3 in which the monohydric alcohol is n-butanol.

5. Composition as in claim 4 in which the metaborate is triethanolamine metaborate and in which the amine is triethanolamine.

6. A concentrated one-phase anti-corrosive liquid solution suitable for addition to water contained in the cooling system of an internal combustion engine to inhibit the corrosion therein, the said solution consisting essentially of an organic solvent which consists essentially of from about 65 to about 95% by volume of propylene glycol and from about 5 to about 35% by volume of at least one monohydric alcohol selected from the group consisting of i-propanol, n-butanol and tert.-butanol, up to about 0.50 gm. of water per ml. of glycol-monohydric alcohol solvent, and dissolved therein, from about 0.005 to about 0.05 gm. of sodium nitrite per ml. of glycol-monohydric alcohol solvent, from about 0.10 gm. to about 1.00 gm. per ml. of glycol-monohydric alcohol solvent of a metaborate of at least one amine selected from the group consisting of the ethanolamines, the propanolamines and diacetonealkamine, from about 0.10 to about 0.30 gm. per gm. of said metaborate of at least one amine selected from the group consisting of the ethanolamines, the propanolamines and diacetonealkamine, and from about 0.15 gm. to about 0.60 gm. of mixed ethylene glycol-glycerol monoricinoleates per ml. of glycol-monohydric alcohol solvent.

7. Composition as in claim 6 in which the monohydric alcohol is n-butanol.

8. Composition as in claim 7 in which the metaborate is triethanolamine metaborate and in which the amine is triethanolamine.

LLOYD M. BURGHART.

REFERENCES CITED

The following references are of record in the file of this patent:

UNITED STATES PATENTS

| Number | Name | Date |
| --- | --- | --- |
| 1,992,689 | Cox | Feb. 26, 1935 |
| 2,126,173 | Clapsaddle et al. | Aug. 9, 1938 |
| 2,147,149 | Clapsaddle et al. | Feb. 14, 1939 |
| 2,386,182 | Balcar | Oct. 9, 1945 |